Sept. 4, 1956  F. A. KROHM  2,761,169
CONNECTOR FOR WINDSHIELD WIPER BLADE
Filed Dec. 5, 1952

INVENTOR.
FRED A. KROHM
BY
Charles S. Penfield
ATTORNEY

United States Patent Office 2,761,169
Patented Sept. 4, 1956

2,761,169

CONNECTOR FOR WINDSHIELD WIPER BLADE

Fred A. Krohm, Hobart, Ind., assignor to Productive Inventions, Inc., a corporation of Indiana Application December 5, 1952, Serial No. 324,299

12 Claims. (Cl. 15—250)

This invention relates generally to the windshield wiper art, and more particularly to a connector for connecting a windshield wiper blade to a windshield wiper arm.

An object of the invention is to provide a connector to be mounted on a windshield wiper blade whereby a windshield wiper arm may be readily inserted and locked securely in such connector, in pivoted relationship for longitudinal rocking movement of said blade with relation to said arm, under such conditions that that relationship may be broken normally without intentional manipulation.

Another object of the invention is to provide a connector with spaced-apart abutment means which may embrace an arm end or entering part with sufficient play between said means and said arm end to permit free movement of the arm between said abutment means and substantially in a plane of the respective longitudinal axis of said arm end and of said blade, without permitting sufficient lateral movement of said abutment means, with relation to said arm, to permit an undesirable degree of rotation of the wiper blade, on its axis, with relation to the arm and with relation to a windshield being wiped.

Other objects of the invention are: to provide a connector which may be manufactured economically; to provide a connector which may be attached securely to a wiper blade with a minimum of effort and labor cost; and to provide a connector which may readily be so securely attached to a wiper blade as to prevent loosening of that attachment under abnormal shocks such as the non-uncommon striking of the blade against a windshield frame as may be caused by wear and "slop" in the linkage of a windshield wiper power mechanism or by excessive speed of operation and consequent whipping of the windshield wiper blade.

Another object of the invention is to provide a connector having a cavity or opening in which an entering part on an arm is received and held and having also a continuous exterior wall providing an unbroken shield resisting the accumulation of foreign matter within the cavity, protecting the entering part or end portion of the arm against accidental displacement from the connector upon handling by servicemen, and providing a smooth exterior surface, thus minimizing danger of abrasion of contacting skin of a service operator and offering minimum obstruction for engagement with cloths used for cleaning windshields.

Another object of the invention is to provide means of connection of a blade with an arm that will permit the driving portion of the arm to extend downwardly to minimize the distance between that portion and the windshield, whereby to reduce the torsional load on the arm.

A particular object of the invention is to provide a novel yieldable locking means having a component slidably and rotatably mounted on the housing of the connector and resilient means for normally maintaining the component in a locking position.

A specific object of the invention is to provide an arrangement whereby the locking component serves to hold the resilient means in an operative position in the connector.

An important object of the invention is to provide a unique arrangement whereby any force tending to accidentally separate the blade unit from the arm unit will develop a holding action in addition to that produced by the yieldable locking means.

A particular object of the invention is to provide a connector with abutment means and in which the resilience of the wiping element serves to influence the movement of the connector so that an entering part on a wiper arm can be detachably held between the abutment means and the channel backing supporting the wiping element.

A further object of the invention is to provide a connector in which the yieldable locking means and a portion of the wiping element jointly act in a manner whereby an entering part on a wiper arm can be detachably held in relation to the connector.

A further object of the invention is to provide a connector having a channel housing supported on the resilient wiping element of the wiper blade with rivet means adjacent the extremities of the housing for reenforcing or bracing the side walls of the housing and locking the housing to said wiping element.

Another object of the invention is to provide a channel housing having an end wall which is formed to conceal one of the rivet means above referred to and at the same time close off one end of the housing so that the entering part on the arm can be inserted only into the other end of the housing.

Another object of the invention is to provide the channel support or backing for the wiping element with a rest for the entering part on the arm.

A significant object of the invention is to construct the locking component of the yieldable locking means in two parts, which parts are so formed that they can be readily assembled with one another and in a novel manner with the connector.

Figure 1:
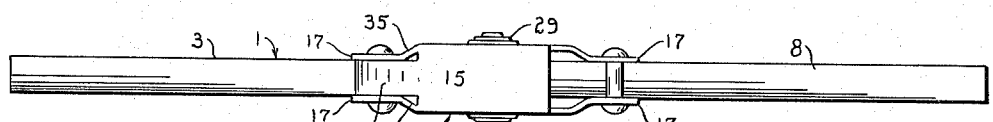
Figure 1 is a top view of the windshield wiper blade unit with the connector attached thereto.
Figure 2:
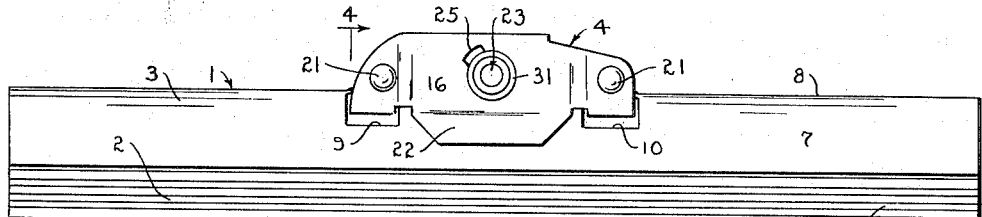
Figure 2 is a side view in elevation of the structure illustrated in Figure 1.

The application includes subject matter related to that in my copending application, Serial No. 297,099, filed July 3, 1952. In the copending application the connector housing is mounted on a pressure unit of the blade assembly whereas in the subject application the housing is mounted on the blade unit.

Referring to the drawings, numeral 1 generally designates a blade unit or assembly comprising a resilient wiping element 2 and a support or backing 3 therefor. This blade unit is provided with a connector generally designated 4 which is adapted for detachable connection with a curved entering part 5 provided on the free end of a wiper arm section 6. The outer end of the part 5 adjacent its inner side is provided with a lug 50.

Describing the blade unit more in detail, the support or backing 3 is preferably made in the form of a channel having side walls 7 and a back wall 8. Each of the side walls is preferably provided with a pair of longitudinally spaced generally rectangular openings 9 and 10. The back wall 8 is preferably provided with an outwardly extending elevated portion or rest 11 located between the rectangular openings.

The wiping element 2 may be constructed in various ways but as herein illustrated preferably includes an outer longitudinally extending wiper portion 12 and an inner longitudinally extending attaching portion 13, the latter of which is confined within the channel support or backing 3 and constitutes resilient means. Each side of the attaching portion of the wiping element is preferably provided with a longitudinally extending groove 14. With this arrangement it will be apparent that portions of the attaching portion 13 of the wiping element are accessible through the rectangular openings 9 and 10 with the grooves 14 more or less located centrally with respect to such openings.

The connector generally designated 4, among other things, includes a channel housing having an outer or base wall 15 and a pair of side walls 16 provided with inset parallel end continuations 17. The housing is further provided with a forwardly extending curved end wall 18 and the rear extremity of the channel is formed to provide an entrance opening for receiving the entering part 5 on the wiper arm section 6. The end wall 18 serves as an unbroken shield to prevent entry of foreign matter into the connector and makes it possible to insert the entering part into only the rear end of the connector.

Figure 4:
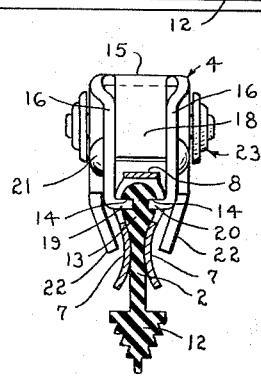
Figure 4 is an enlarged transverse section taken substantially on line 4—4 of Figure 2.

The connector 4 may be attached to the blade unit in various ways but as herein exemplified the connector is preferably resiliently mounted for pivotal movement on the attaching portion 13 of the wiping element. More particularly in this respect, each of the side walls of the housing of the connector is provided with a pair of longitudinally spaced inturned projections or fingers 19 and 20 which seat or nest in the longitudinal grooves 14 provided in the attaching portion of the wiping element as clearly illustrated in Figure 4.

In order to reenforce the housing and prevent spreading of its side walls 16, fastening means preferably in the form of rivets 21 are extended through suitable apertures provided therefor in the end continuations 17 for permanently securing the side walls including the end continuations of the housing in predetermined substantially parallel relationship. With this novel arrangement the connector is permanently held in operative connection with resilient means, which as herein shown is the attaching portion of the wiping element. It is to be understood that the use of the term "resilient means" is intended to include a portion of the wiping element or any suitable means in the channel support for resiliently supporting the connector. It will be noted that the size of the rectangular openings 9 and 10 in the side walls of the support 3 and the size of the inturned projections or fingers 19 and 20 formed on the side walls of the connector housing are so constructed and arranged that the connector is resiliently supported on the attaching portion 13 substantially independently of the support 3, thereby affording a substantially noiseless but efficient connection for promoting free rocking movement of the blade unit relative to the connector when the unit is directed back and forth across a windshield. The range of this rocking movement is preferably predetermined or controlled by a pair of inturned longitudinal flanges 22 formed on the lower extremities of the side walls of the connector housing. These flanges are so arranged that one may engage one side of the support 3 when the blade unit is travelling in one direction across a windshield and then the other flange will engage the other side of the blade unit when the unit is travelling in an opposite direction, and so on.

Various means may be utilized to detachably connect the connector to the wiper arm but as herein shown, the means employed for this purpose is preferably in the form of yieldable locking means comprised of a holding or locking component or assembly generally designated 23 and resilient means in the form of a spring 24. More particularly, each side wall 16 of the connector housing is provided with guide means preferably in the form of a slot 25 disposed at an acute angle with reference to the longitudinal axis of the blade unit 1. The locking component extends transversely through the slots and is slidable and rotatable therein. The locking component 23 preferably includes a tubular cylindrical member 26 and a pin member 27. The cylindrical member 26 is provided with a hole 28 and a circular end flange 29 and the pin member is provided with a shank 30 and a circular end flange 31 corresponding to the flange on member 26. These members when assembled more or less simulate the appearance of a dumbbell. To assemble the members 26 and 27 with one another and the connector housing is a simple matter and is accomplished by inserting the cylindrical member 26 through the slots 25 and then press fitting the shank 30 of the pin member in the hole 28 of member 26. The end flanges of the members limit the extent of the axial movement of the locking component in the slots and provide means which can be readily engaged by the fingers of a hand for manually retracting the locking component to release the entering part 5 of the wiper arm section 6 from the connector.

Figure 3:
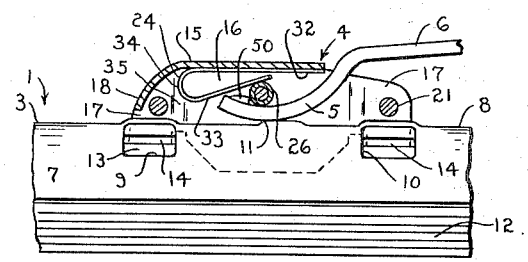
Figure 3 is a side view in elevation of the assembly shown in Figure 2 with the connector in longitudinal section to exemplify the details of its construction and the operative relationship between the wiper arm and the connector.

The leaf spring 24 constituting a part of the yieldable locking means is arranged within the confines of the connector housing and preferably includes an elongated flat leg portion 32 which bears against the inner surface of the outer wall 15 of the channel housing and a shorter flat leg portion 33 joined to the leg portion 32 by a curved portion 34. The free extremity of the short leg bears against the locking component 23 as shown in Figure 3 to normally urge the component in an acute angular direction against the lower marginal edge portions of the slots which portions constitute abutment means. The width of the spring is preferably slightly less than the distance between the inner surfaces of the side walls 16 of the connector housing and the curved portion 34 is normally maintained in engagement with a pair of shoulder portions 35 joining the inset end continuations 17 at the forward end of the connector with the side walls. In other words, the bearing relationship between the free extremity of the short leg portion and the locking component is such that the component retains the spring within the confines of the connector housing as shown in Figure 3. The relationship between the parts is also preferably such that when the blade unit and arm unit are connected, the short leg 33 will tend to take a position substantially transverse to the line or path of travel of the locking component so as to derive within practicable limits the full force and effect of the spring.

To connect the wiper blade unit with a wiper arm is a relatively simple matter. The curved entering part 5 is inserted into the opening provided at the rear end of the connector and between the locking component 23 and the rest 11 which will cause the component 23 to move outwardly in the slots 25 until the entering part is properly positioned in the connector, whereupon the component will snap back to an operative position behind the lug 50 on the entering part to positively lock the blade to the wiper arm and maintain the outer curved surface of the entering part in contact with the rest 11. Since the connector housing is resiliently mounted on the resilient means in the channel backing 3, this means will be compressed or distorted so that it will jointly act with the yieldable locking on the connector to hold the entering part attached to the connector. More particularly in this regard whenever an entering part is inserted into the connector the fingers 19 and 20 on the connector will compress portions of the attaching portion 13 against the back wall of the channel backing and allow the connector to move outwardly to some extent. This movement of the connector contributes to holding an entering part between the backing and the locking component 23. It is therefore manifest that the yieldable holding means comprising the component 23 and spring 24 coact with the attaching portion of the wiping element to hold an entering part with respect to the wiper blade. The relationship between the members is such that any force tending to separate the blade from the wiper arm will automatically cause the locking component to be drawn against the entering part and the latter against the rest 11 to doubly insure a positive lock. The width of the entering part is slightly less than the distance between the inner surfaces of the side walls 16 of the connector housing so that rocking movement of the connector is confined to the plane of the arm and not laterally therefrom. In other words, the side walls constitute abutment means limiting side play and/or lateral rock between the connector and entering part.

To disconnect the wiper blade from the wiper arm it is only necessary to grasp the end flanges 29 and 31 of the locking component and pull outwardly on the locking component, whereupon the entering part can be readily withdrawn from the connector.

Figure 7:
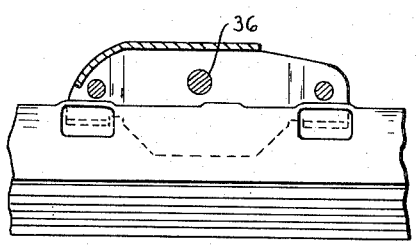
Figures 7 and 8 show a modified form of the invention in which the resilience of the wiping element is utilized to hold an entering part on a wiper arm in relation to stationary or fixed abutment means provided on a connector.
Figure 8:
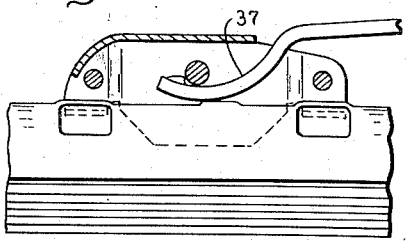
Figure 5:
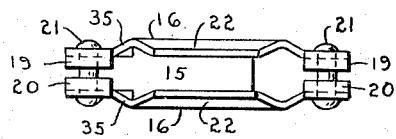
Figure 5 is a bottom view of the connector housing showing the details of its construction.
Figure 6:
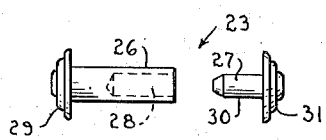
Figure 6 is an exploded view showing the members comprising the locking component of the yieldable locking means.

Referring to the modified form of the invention exemplified in Figures 7 and 8 of the drawing there is disclosed a connector which substantially corresponds to the connector housing above described, except that the housing is provided with fixed abutment means 36 in lieu of the yieldable locking component 23 and spring 24 above referred to. When an entering part 37 is inserted into the connector between the abutment means 36 and the back of the channel support the connector will compress the attaching portion of the wiping element. This compression of the attaching portion as shown in Figure 8 will cause the connector to force the entering part against the backing and the lug on the entering part will prevent escape of such part from the connector. To release the entering part the connector is merely manually pulled outwardly away from the backing.

Having thus described my invention, it is obvious that various other modifications may be made in the same without departing from the spirit of the invention; and, therefore, I do not wish to be understood as limiting myself to the exact forms, constructions, arrangements, and combinations of parts herein except as shown, and defined in the claims described.

I claim:

1. A connector for establishing a detachable connection between a windshield wiper blade unit and a wiper arm, said connector comprising an elongated housing having side walls, slots provided in said side walls and arranged at an angle with reference to the longitudinal axis of the housing, a locking means slidably mounted in the slots for holding an entering part on a wiper arm to the housing, and a pair of means respectively extending through the ends of the side walls to prevent spreading of such walls.

2. A windshield wiper blade comprising a wiping element and an elongated support engaging said element substantially throughout its length, said support having a bearing surface, a housing secured to the blade, yieldable locking means arranged substantially in the housing, means for controlling the locking means for movement in an angular direction toward the bearing surface for holding an entering part on a wiper arm against said surface.

3. A windshield wiper blade comprising a channel backing provided with a bearing, a resilient wiping element having an outer longitudinal wiping portion and an inner attaching portion confined within the channel backing, an opening provided in the channel backing providing access to the attaching portion of the wiping element, a connector provided with means engaging the attaching portion for resiliently supporting the connector thereon, and locking means carried by the connector and disposed in cooperative relationship with the bearing for clamping an entering part on a wiper arm when inserted therebetween.

4. A windshield wiper blade comprising a channel backing and a resilient wiping element, said wiping element having an inner longitudinal extending attaching portion confined within the channel backing and an outer longitudinally extending wiping portion, a channel housing having an outer wall and side walls, said side walls being provided with means cooperating with the attaching portion of the wiping element to provide a resilient support for the housing, abutment means disposed within the confines of the housing, slots provided in the side walls of the connector housing, a locking component slidably mounted in the slots, and resilient means arranged in the housing and bearing against the locking component for urging the component toward the abutment means for holding an entering part on a wiper arm between the component and abutment means.

5. A windshield wiper blade comprising an elongated support and an elongated resilient wiping element, said wiping element having an attaching portion operatively connected to the support and a longitudinally extending wiping portion, a connector directly carried by the wiper blade, said connector being provided with a slot, a locking component slidably mounted in the slot, abutment means disposed between the component and wiping element, and resilient means acting on the locking component for urging the locking component in a direction toward the abutment means whereby to assist in locking an entering part on a wiper arm between the component and said abutment means.

6. A windshield wiper blade, an elongated connector carried by said blade, means extending through the side walls to prevent spreading thereof, said connector having an outer wall and side walls, said side walls being provided with guide means, resilient means associated with the connector, abutment means disposed within the confines of the connector, and a locking component movably mounted in said guide means receiving pressure from said resilient means for urging the locking component in an acute angular direction with respect to the longitudinal axis of the blade and toward the abutment means for detachably holding a wiper arm part between the abutment means and component.

7. A windshield wiper blade comprising an elongated channel backing, a resilient wiping element having an attaching portion confined within the channel and an exposed wiping portion, openings provided in the channel backing providing access to the attaching portion, a connector housing having an outer wall and side walls, said side walls being provided with means supported on the attaching portion so the latter provides a resilient mounting for the connector housing, and means carried by the side walls for detachably holding an entering part on a wiper arm in the housing.

8. A windshield wiper blade comprising an elongated channel backing, a resilient wiping element attached to the channel backing, resilient means disposed in the channel backing, a connector operatively related to said resilient means in a manner whereby to provide a resilient mounting for the connector, and locking means provided on the connector disposed in a predetermined spaced position with respect to the backing, the arrangement being such that when an entering part on a wiper arm is inserted between and in direct engagement with the locking means and backing the resilient means will assist in holding the entering part in place.

9. A windshield wiper blade comprising an elongated channel backing, a resilient wiping element attached to the channel backing, resilient means disposed in the channel backing, a connector operatively related to said resilient means in a manner whereby to provide a resilient mounting for the connector, and yieldable holding means carried by said connector, said resilient means and said yieldable holding means being arranged in a coacting relationship for detachably holding an entering part on a wiper arm between and in direct engagement with the backing and holding means.

10. A windshield wiper blade comprising an elongated channel backing, a resilient wiping element attached to the channel backing, resilient means disposed in the channel backing, a connector operatively related to said resilient means in a manner whereby to provide a resilient mounting for the connector, a locking component movably mounted on the connector and arranged in a predetermined position with respect to the backing, and resilient means for normally maintaining said locking component in said predetermined position, the arrangement being such that when an entering part on a wiper arm is inserted between and in direct engagement with the locking component and the channel backing the resilient means carried by the connector and the resilient means carried by the backing will jointly act to retain such part assembled with the wiper blade.

11. A windshield wiper blade comprising an elongated wiping element and an elongated support supporting the element substantially through its length, a connector mounted on the blade, said connector having a pair of side walls provided with guide means disposed at an acute angle with reference to the longitudinal axis of the blade, said support being provided with bearing means disposed between the side walls, a locking member carried by the side walls and guided in movement by said guide means, and resilient means disposed between the side walls for normally urging the locking member toward the bearing means for holding an entering part on a wiper arm against said bearings means.

12. A windshield wiper blade comprising an elongated resilient wiping element and an elongated member supporting the element substantially throughout its entire length, said member being provided with a rest, a connector mounted on the blade for connection with an entering part of a wiper arm, means on the connector for holding the entering part to the connector and for movement on the rest, and resilient means for normally urging the holding means toward the rest and elongated member.

References Cited in the file of this patent

UNITED STATES PATENTS

| 749,438 | Harrington | Jan. 12, 1904 |
| 2,087,686 | Horton | July 20, 1937 |
| 2,160,736 | Horton | May 30, 1939 |
| 2,260,905 | Horton | Oct. 28, 1941 |
| 2,432,691 | Smulski | Dec. 16, 1947 |
| 2,632,910 | Anderson | Mar. 31, 1953 |

FOREIGN PATENTS

| 657,822 | Great Britain | Sept. 26, 1951 |